Aug. 22, 1967 W. TUTTLE 3,336,793

FILTER TEST METHOD AND APPARATUS

Filed March 3, 1965 2 Sheets-Sheet 1

INVENTOR.
WAINWRIGHT TUTTLE
BY
*Lockwood, Woodard, Smith & Weikart*
Attorneys

INVENTOR.
WAINWRIGHT TUTTLE

United States Patent Office 3,336,793
Patented Aug. 22, 1967

3,336,793
FILTER TEST METHOD AND APPARATUS
Wainwright Tuttle, Cincinnati, Ohio, assignor to Commercial Filters Corporation, Lebanon, Ind., a corporation of New York
Filed Mar. 3, 1965, Ser. No. 436,761
9 Claims. (Cl. 73—40)

ABSTRACT OF THE DISCLOSURE

A filter test method and apparatus wherein a filter element is chucked on a rotatable spindle which is the piston rod of a fluid cylinder. Retraction of the piston rod by the piston deforms an elastic ring to hold the element firmly and to seal the open end thereof. The filter is immersed and rotated within a liquid bath to entirely coat the filter area of the filter. Pressure regulated gas is admitted to the interior of the filter. The interior of the filter element and a fluid pressure indicating instrument is a closed system except for the pores of the filter medium and any flaws present therein. A drop in pressure in this closed system, indicates leakage.

---

This invention relates broadly to the manufacture of fluid filters and more particularly to the testing of pleated paper filter elements for quality control.

Filter elements normally require a very large surface area both to permit a free flow of fluid through them and to permit the accumulation of a large quantity of foreign matter without restricting the flow excessively.

The normal range of pore sizes in a filter is such that foreign particles larger than a certain size cannot pass through. If flaws are present in the filter and they are larger than the normal pore size range, larger particles can pass through and render the filter ineffective for its purpose.

Various means are employed to test filters for such flaws, such as the duplication, on a test basis, of the actual conditions under which they are to be used. However, these methods of test are lengthy and can, therefore, be employed only on a small sample of actual production.

Since there are many sources of many types of flaws in actual production, the only effective method of rejecting faulty filter elements is a 100% test. This requires that the test keep pace with production.

Since a rejectable flaw may represent only .00001 of the total flow area of a large filter, any flow increase due to the presence of such a flaw would be far less than the normal flow variation from element to element. Hence flaw detection is virtually impossible by fluid flow determination.

A test method which would give an immediate signal of the presence of the smallest rejectable flaw would be very valuable in the production of dependable filters.

It is therefore a principal object of this invention to provide a method and apparatus to test pleated paper or other types of large area fine filtering fluid filter elements for flaws, very rapidly.

It is a further object of this invention to provide a method and apparatus to test pleated paper fluid filter elements rapidly for all rejectable flaws down to the smallest.

It is a further object of this invention to provide a method and apparatus to test pleated paper fluid filter elements 100% at low cost.

Described briefly, according to one embodiment of my invention, a filter element is chucked on a rotable spindle which is the piston rod of a fluid cylinder. Retraction of the piston rod by the piston deforms an elastic ring to hold the element firmly and to seal the open end thereof. The piston rod also contains a central passageway from a rotary fluid joint communicating from the interior of the filter to a source of gas pressure and a pressure-indicating instrument.

Provision is made for a liquid bath for partial immersion of the filter. The filter is rotated while immersed in the bath to entirely coat the filter area of the filter. The filter is then removed from the bath, and rotation is continued.

Pressure regulated gas is admitted to the interior of the filter. Then a valve is closed between the gas pressure source and the passage from the interior of the filter to the fluid pressure indicating instrument. This permits the interior of the filter element and the fluid pressure indicating instrument to be a closed system except for the pores of the filter medium and any flaws present therein. The drop in pressure in this closed system as time passes, indicates leakage. It is the surface tension of the bath liquid with which the filter is coated, together with the small pore size, which prevents leakage unless a flaw is present in the filter medium.

The full nature of the invention will be understood from the accompanying drawings and the following description and claims:

Figure 1:
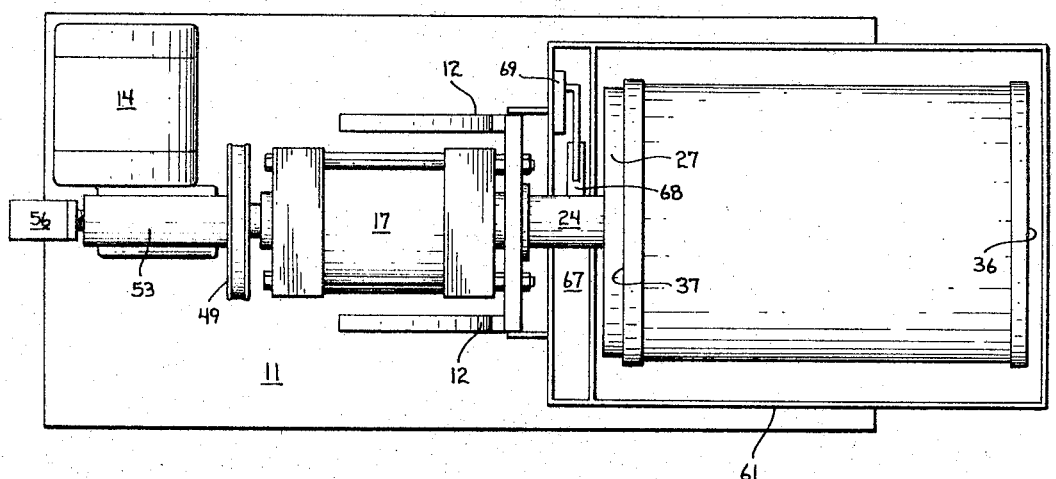
FIGURE 1 is a top plan view of apparatus employed according to a typical embodiment of the present invention.

Referring now to the drawings in detail, the apparatus is provided with a stationary base plate 11 having an upstanding chucking cylinder support member 12, a tank cylinder support member 13, and a variable speed gear motor 14 mounted thereto. The support member 12 has the thrust bearing assembly 16 and air cylinder assembly 17 mounted thereto. This air cylinder assembly has a piston 23 therein driving a piston rod 21 connected to the piston. The piston rod has a portion 18 extending from the front end and a portion 19 extending from the rear end of the cylinder. The piston rod has a bore 22 therein extending the full length of the piston rod. This piston rod is movable axially in the air cylinder assembly by means of the piston 23 secured thereto and is also rotatable in the cylinder, being supported at each end of the cylinder by a bushing and sealed by packing glands according to conventional practice.

Chucking means are provided at the front end of the air cylinder assembly. They include a cylindrical sleeve 24 mounted on the piston rod portion 18 and having a thrust flange 26 axially supported by the thrust bearing 16, and a sealing and support flange or face plate 27 with a flat front face 28 lying in a plane perpendicular to the axis 29 of the sleeve and the air cylinder assembly.

The filter being checked is a standard generally cylindrical pleated paper engine air filter assembly which includes a closed end cap 36 and the annular open end cap 37, both of these caps being formed to fittingly receive opposite ends of the pleated paper filter medium 38 which forms the wall of the filter assembly. The pleated paper is normally bedded in vinyl plastisol at the ends for assembly and sealing. Rigid perforated inner and outer support shells 39 and 41, respectively, may be provided in such filter assemblies.

With the flat surface 42 of the open end cap 37 of the filter assembly placed flat against the face 28 of the chuck face plate 27, the piston rod 21 is pulled to the rear by air pressure in the air cylinder assembly 17. Because the rear surface 43 of the seal member 34 projects to the rear from the rear face 44 of the clamp disc, this action of the piston rod expands the seal member 34 against the inner face 46 of the flange of the filter end plate 37. The filter is thus sealed to the chuck, so that the only possible outlet from the interior 47 of the filter assembly is through the aperture 22 in the piston rod or through the filter medium or some flaw in the filter assembly itself. A seal member 48 is provided to maintain a gas-tight seal between the disc 31, and piston rod 21, when the filter is chucked for testing.

A pulley or sprocket 49 is mounted to the piston rod portion 19 and is keyed thereto by the key 51 to enable the motor 14 to drive the air cylinder assembly in rotation, by means of the drive belt 52. An adaptor 53 is also mounted to the portion 19 and has a fitting 54 threadedly received therein, the fitting 54 being part of a rotary pressure joint having an input thereto from a gas source 56 through a supply line 57. This rotary joint is a standard product and provides gas-tight comunication from a stationary pipe 57 to the aperture 58 in the adaptor 53, this aperture communicating with the bore 22 of the piston rod 21. A seal 59 is provided between the adaptor and piston rod to assure that no gas leakage occurs at this point.

To provide for immersion of the filter, a reservoir tank 61 is mounted to the top of the piston rod 62 of a second air cylinder 63 supported by the base plate 11 and support member 13. The tank is shown in the elevated condition and the surface 64 of the liquid therein is above the level of the inner margin of the portion of the filter medium 38 immersed therein. In this way there is assured the opportunity for the entire outer surface of the filter medium to become coated with the liquid in the tank as the filter assembly is rotated through one completed revolution. A partition 66 is provided in the tank for a float chamber 67 in which the float 68 and float-operated liquid level control valve switch 69 are located.

Figure 2:
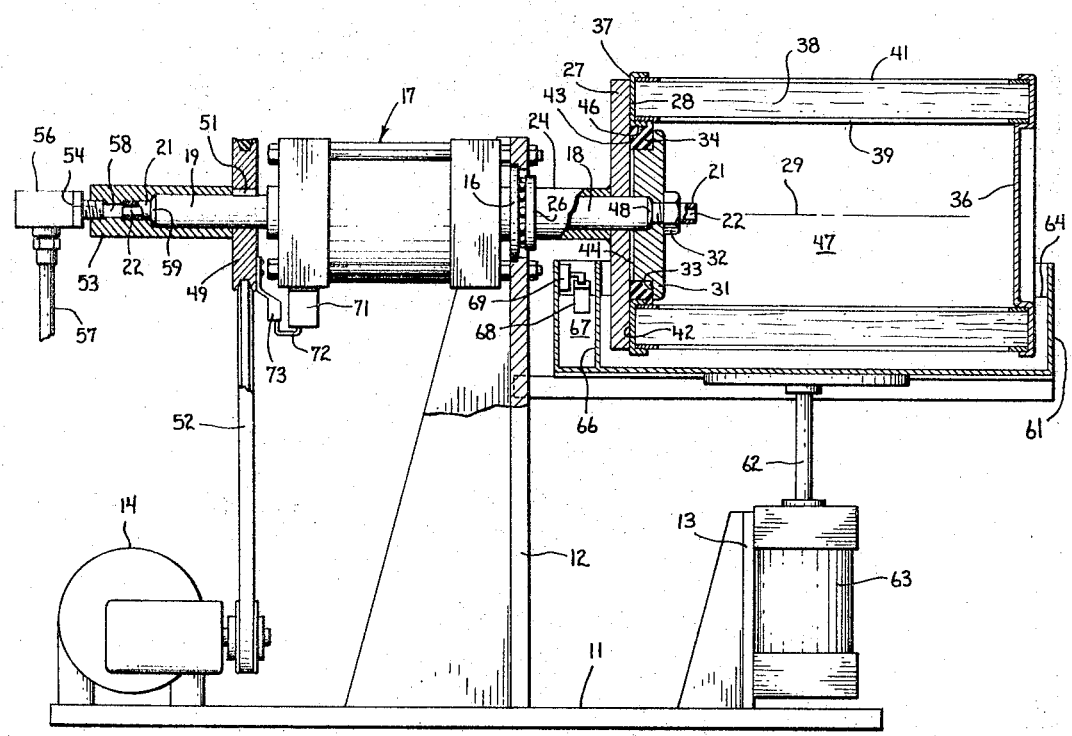
FIGURE 2 is an elevational view thereof, with portions of the apparatus and the filter being shown in section, the plane of the section being a vertical plane containing the axis of rotation of the filter chuck.

Referring particularly to FIGURE 2, an air switch 71 is mounted to the air cylinder 17 and may have an actuator member 72 engageable by a cam 73 mounted on the pulley 49 as the pulley is rotated. The actuator can be thereby actuated once for each revolution of the air cylinder piston rod by the motor 14.

An understanding of the control circuitry wil be facilitated if the method is first described, which will now be done.

Wth the liquid reservoir lowered and with the clamping pressure off the piston rod 21, a filter element is placed on the chuck and a starting button is depressed. This applies clamping pressure in the chucking air cylinder assembly and the piston rod moves to clamp the filter element and seal the opening. The tank of liquid rises and the filter begins to rotate, saturating the filter medium with the liquid and maintaining a uniform distribution without rundown. At the end of one revolution, the tank lowers and the gas valve opens. At the end of a predetermined number of seconds, the gas valve closes. The operator observes a pressure indicating instrument.

If the filter element is free of flaws, the pressure is maintained. If one or more flaws are present, the pressure falls at a rate which is a function of the size and number of flaws. Where the flaws are small the pressure falls to a lower value and remains fixed at this lower value. The final value is a function of the size of the largest flaw. If there are no flaws, it is a function of the normal pore size of filter paper and hence can be used as a means for quality control for the filter paper itself.

After the operator accepts or rejects the filter element, he depresses another control button and the rotation of the filter stops and the chuck releases it to be placed on a rapidly rotating mandrel for salvage of the liquid.

Figure 3:
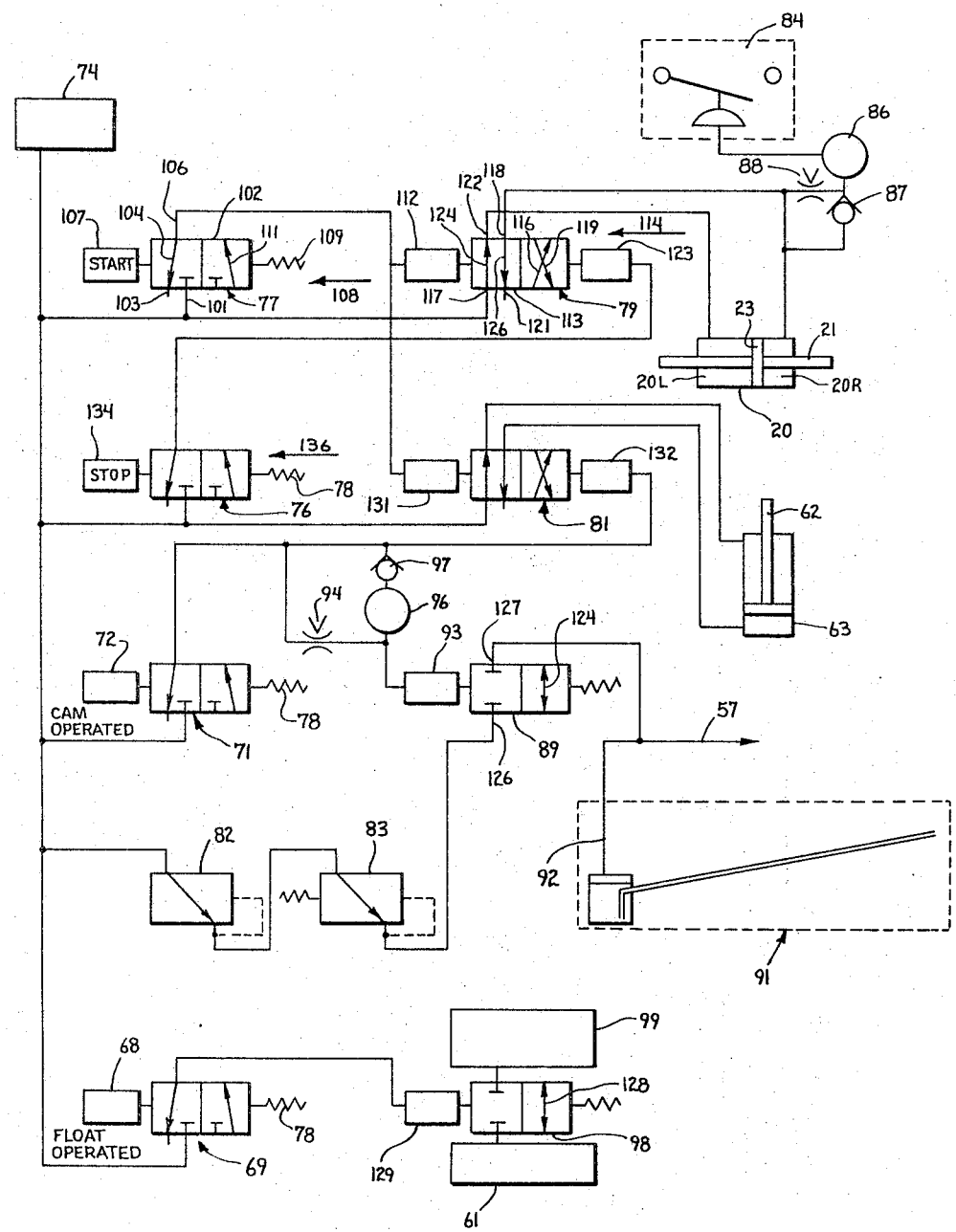
FIGURE 3 is a schematic diagram of the pneumatic control system of the apparatus.

Referring now to the schematic diagram of FIG. 3, an air supply source 74 applies air under pressure to a series of manually or mechanically operated pilot valves or switches, these including switches 69, 71, 76 and 77. All of these switches are two position switches and each is provided with a spring bias as indicated at 78, to normally hold the switch in the position shown.

Air from the source is also applied to air-operated two-position directional valves 79 and 81. The pressure source 74 is also connected to a pair of pressure regulators 82 and 83, the first being a conventional regulator having a maximum output of approximately 10 pounds per square inch (p.s.i.) and the second having an adjustable range of outputs from two inches of water to eight inches of water.

A normally-open, air-operated electrical switch 84 is provided for the gear motor 14 and the air input thereto is provided from an accumulator 86 having an input through a variable resistance device 88.

The clamping cylinder 20 of the air cylinder assembly 17 is also shown with the piston 23 and piston rod 21 therein. A normally-closed air-operated shut off valve 89 is provided between the output of regulator 83 and the line 57 to the filter. A water manometer 91 has its input line 92 connected to the line 57. The air operator 93 for the shut off valve 89 is connected to the switch 71 through parallel paths, one of which includes the variable resistance device 94 therein and the other of which includes the serial arrangement of the accumulator 96 and one way check valve 97.

An air operated liquid shut off valve 98 is connected between the liquid supply tank 99 and the liquid bath tank 61 of FIGURES 1 and 2.

Referring specifically to switch 77, the input port 101 from the air source is normally blocked by the spool 102 and the vent port 103 to atmosphere is in registry with the passage way 104 in the spool to the output port 106. The expression "spool" is used merely for purposes for explanation as other constructions may also be employed. When the manual operator 107, which may be a push button, for example, is depressed in the direction of the arrow 108 against the bias of the return spring 109, the passage way 111 in the switch is placed in registry with the port 101 and port 106 to admit air to the air operator 112 of the distributor valve 79. The operator will thus move the spool 113 of this valve in the direction of the arrow 114. This places passageway 116 in registry with the supply port 117 of the valve and output port 118 thereof. It also places the passageway 119, which is not connected or intersecting passageway 116 in the actual unit, to the vent port 121 and to the port 122. The distributor valve will then remain in this position until air is released from the operator 112 and applied to the operator 123 to shift the valve back to the position shown wherein the passageway 124 is in registry with ports 117 and 122, and passageway 126 is in registry with ports 118 and vent port 121.

The distributor valve 81 is constructed to function in the same manner as valve 79 and switch 76 functionally is the same as switch 77. Similarly, switch 71 is basically the same as switch 77 except for the fact that the operator therefor is the cam which actuates the switch once for each revolution of the filter assembly being tested. Similarly, the switch 69 is operated by the float.

The shut off valves 89 and 98, when actuated by application of pressure to the air operators thereof shift to place the passageway 124 (in the case of valve 89) in communication with the input line 126 thereto and the output line 127 therefrom. Similarly, the passageway 128 in valve 98 provides communication between the supply tank 99 and the bath tank 61 when air is applied to the actuator 129.

Operation of the device may begin with all of the valves and switches in the position shown, the float in the tank 61 having esablished the level of liquid therein at the proper location. The filter element to be tested is placed against the plate 27 (FIG. 2) whereupon the manual start button 107 is depressed in the direction of the arrow 108. Switch 77 shifts to supply air under pressure to the operator 112 for valve 79 and to operator 131 for valve 81. Valve 79 shifts to apply source air pressure to chamber 20R in the clamping cylinder 20 moving the piston 23 to the left, chamber 20L being vented through valve 79. This clamps the filter in place.

The shifting of the valve 81 applies source air pressure under the piston in the tank elevating cylinder 63 to raise the bath tank 61 into position shown in FIG. 2.

Meanwhile, the line air pressure applied to the upstream side of the resistance 88 and check valve 87 has filled accumulator 86 and closed the switch 84 energizing the drive motor 14 and initiating the rotation of the filter after a delay.

After one revolution of the filter, the cam 73, or other suitable means, operates the controller for the air switch 71 which then supplies line air pressure to operator 132 for valve 81. Meanwhile, the start button has been released whereupon valve 77 has shifted back to original position venting the actuator 131 to atmosphere. Application of pressure to the controller 132 shifts valve 81 back to the position shown whereupon pressure is applied to the top of the piston in the tank elevating cylinder and is vented from below the piston through the valve 81. The bath tank is thereby lowered. After a suitable delay as determined by the variable resistance device 94 and accumulator 96, air is also delivered from the switch 71 to the operator 93 for the shut off valve 89. This shifts the valve to place the regulated air supply line 126 in communication with the line 127 and, therefore, with the filter through line 57 and the central bore 22 of the piston rod of the chucking air cylinder assembly. Soon the pressure in the filter rises to the desired level, assuming no leaks, the cam releases the follower 72 and the valve switch 71 returns to its original position. This initiates the venting of air from the accumulator 96 through the variable resistance device 94 to atmosphere through the switch 71 and the delay determined by the adjustment of the device 94 will keep valve 89 opened for a predetermined period of time. Then when the pressure on actuator 93 has dropped below a certain level, the valve will then again be returned to initial position by the biasing spring whereupon the manometer 91, line 92, line 57, and chamber 47 in the filter constitute a closed system, the valve 89 blocking any venting. The operator then observes the level in the manometer to determine whether or not there is any leakage and if there is leakage, he determines the rate of leakage. Then the operator presses stop button 134 which moves the stop switch 76 in the direction of the arrow 136 against the spring bias. This applies pressure from the air source 74 through the switch 76 to the operator 123 for valve 79 which returns the valve to the position shown in the diagram whereupon chamber 20R of the clamping cylinder 20 is vented to atmosphere, motor switch 84 opens stopping rotation, and air pressure is applied from the source to the chamber 20L. This moves the clamping cylinder piston to the right to release the filter element. Thus, the test is completed.

The method of the present invention utilizes the fact that surface tension of a liquid permits an enclosure composed of small pores and saturated with the liquid, to hold static pressure which is a direct function of the surface tension of the liquid and an inverse function of the size of the pores in the filter medium. One common example of this is the inflation of a wet pillowcase with air whereupon the pillowcase will hold air without collapsing.

The present invention, because it enables not only the detection of flaws but the determination of the size of flaw or flaws, permits tailoring of inspection methods to the customer's requirements. This is particularly helpful where the customer's acceptance level permits flaws up to a certain size in correlation with their sampling acceptance test method.

The various components incorporated in the apparatus can be obtained commercially or easily constructed. An example of regulator 83 is the Model 40–2, one-quarter inch "Nullomatic" air pressure regulator obtainable from Moore Products Company, Springhouse, Pa. The sealing member 33 can be very satisfactorily made from abrasion resistant urethane rubber of 60 durometer hardness.

If it is desirable to use a material other than air for the pressure testing, the regulator 82 can be connected to the source of some other gas. This will permit locating leaks by the use of the thermistor-bridge gas leak detector developed by the Naval Research Laboratory and described in NRL report 5647, July 3, 1961, this report being published by the Department of Commerce Office of Technical Services. Examples of materials and values for one typical test procedure can be cited for the testing of an internal combustion engine intake air filter of pleated paper with an average of sixty micron pores, which will filter solid particles down to fifteen microns due to labyrinthine passages and electrostatic attractions. For this purpose, the liquid for the bath can be tetrachloroethylene (Perchlorethylene). The pressure differential which the filter will hold with no flaws is approximately four inches of water column. The rate of pressure drop with minimum acceptable flaws present is three inches of water in twenty seconds. The terminal static pressure which the surface tension of the liquid in this flaw will hold is one inch of water.

The examples given in the foregoing are merely for purpose of explanation. It is recognized that variations within the scope of the invention may now occur to one skilled in the art. Therefore, while the invention has been disclosed and described in some detail in the drawings and foregoing description, they are to be considered as illustrative and not restrictive in character, as modifications may readily suggest themselves to persons skilled in this art and within the broad scope of the invention, reference being had to the appended claims.

The invention claimed is:
1. A filter testing method comprising the steps of:
coating the entire outer surface area of the filtering medium of a filter element with a liquid having a surface tension adequate to prevent leakage of a gas through the flawless portions of the filter medium;
sealing the interior of the filter element from the environment of the filter element and admitting a gas to the interior thereof;
establishing a predetermined pressure of the gas in the interior of said filter element;
terminating the admission of the gas to the interior of said filter element and preventing leakage of gas therefrom otherwise than through the filter element;
and determining whether or not there is a pressure drop and when there is a pressure drop determining the rate of pressure drop of the gas in the interior of said filter element after termination of admission of the gas thereto.

2. The method of claim 1 and further comprising the steps of:
immersing a portion of the filter element in a bath of said liquid for coating;
rotating said element in said bath to coat the entire outer surface of the filter medium;
and removing said filter element from immersion during determination of the rate of pressure drop therein.

3. A filter testing method comprising the steps of:
coating the entire outer surface area of the filtering medium of a filter element with a liquid;
sealing the interior of the filter element from the filter environment and admitting a gas to the interior thereof;
moving said filter element and thereby maintaining a uniform coating of said liquid thereon during admission of said gas;

establishing a predetermined pressure of the gas in the interior of said filter element;

terminating the admission of the gas to the interior of said filter element and sealing off the interior thereof and applying the pressure therein to an indicator;

moving said filter element and thereby maintaining a uniform coating of said liquid thereon during application of pressure therein to said indicator;

and determining the rate of pressure drop in the interior of said element after termination of admission of the gas thereto.

4. The method of claim 3 wherein:

the moving of said filter element is in rotation at a rate preventing rundown of said liquid on said filter element and avoiding throwing of said liquid from said filter element.

5. A method for detection and measurement of flaws in a filter element comprising the steps of:

coating the entire outer surface area of the filtering medium of a filter element with a liquid having a surface tension adequate to prevent leakage of a gas through the flawless portions of the filtering medium;

admitting a gas to a closed space exposed to one side of the filtering medium of said filter element;

establishing a pressure differential between said space and the liquid exposed to the the filtering medium;

sealing off said space to prevent further admission of gas thereto;

determining the rate of change of said pressure differential between one side and the other side of said filtering medium;

and rotating said filter element during determination of rate of change of said pressure differential at a rate preventing rundown and throw-off of said liquid.

6. A filter testing method comprising the steps of:

coating the entire outer surface area of the filtering medium of a filter element with a liquid;

rotating the filter element at a rate preventing rundown and throw-off of said liquid;

sealing the interior of the filter element from the filter environment and admitting a gap to the interior thereof;

and establishing a pressure of the gas in the interior of said filter element, which pressure is adequate to overcome surface tension of said liquid at the locations of flaws and inadequate to overcome surface tension of said liquid at flawless portions of said filter element.

7. A filter testing apparatus comprising:

a base having thereon a variable speed drive motor, a support member supporting a bearing having a horizontal axis, and a lifting cylinder;

a test filter element receiver mounted for rotation on said bearing on the horizontal axis, said receiver having a flat receiver face thereon perpendicular to said axis;

a generally cylindrical filter assembly having an annular end member defining an opening in one end of said filter assembly, said end member being abuttingly received on said face, a clamping disc mounted on said receiver and centered on said axis and including a sealing member sealingly engaging said face and said end member and expanded into position clamping said end member and thereby said filter assembly to said receiver with the cylindrical axis of said filter assembly colinear with said horizontal axis;

a clamping actuator including a double acting pneumatic cylinder having a piston therein with a hollow piston rod extending in both directions from said piston through both ends of said cylinder and having said clamping disc secured thereto, said cylinder and piston rod being centered on said horizontal axis and said piston being movable axially to move said clamping disc axially for decreasing force of engagement of said sealing member with said face to allow contraction of said sealing member thereby releasing said filter assembly from said receiver;

drive means connecting said motor to said receiver, clamping actuator and disc and operable to simultaneously rotate said receiver and disc;

a tank mounted on said lifting cylinder and movable vertically between a lowered position at an elevation entirely below the filter assembly mounted to said receiver and a raised position surrounding a segment of the filter assembly mounted and clamped to said receiver whereby a portion of the filter element of the filter assembly is immersed in a liquid in said tank, said tank including a partition defining a filter immersion chamber and a float chamber with means for communication therebetween, said float chamber having a float therein to maintain a predetermined liquid level therein;

a source of air pressure;

a first distributor valve coupled to said source and operable between a first filter-release position venting one side of said piston and pressurizing the other side of said piston and a second filter-clamping position pressurizing said one side of said piston and venting the other side of said piston, to control clamp and unclamping of the filter assembly;

a first manually operable pneumatic start switch operable when actuated to position said first distributor valve in said second position and clamp said filter assembly;

a pressure responsive motor control switch electrically connected to said motor and pneumatically connected through an accumulator and the parallel combination of a first check valve and first variable flow resistance means to said first distributor valve, said motor control switch being operable, when pressurized, to energize said motor, said first distributor valve being thereby operable when in said second filter-clamping position to close said switch and energize the drive motor for rotation of said filter assembly, said first distributor valve being operable upon return to said first position to vent said accumulator to atmosphere through said first variable resistance means and said first check valve to effect opening of said motor switch after said first distributor valve is returned to said first position;

a second distributor valve having a first position normally applying air pressure from said source to the upper end of a piston in said lifting cylinder to hold said tank in the lowered position, and said second distributor valve having a second position and being operable in said second position to apply air pressure to the underside of the piston of said lifting cylinder and vent the upper side of said piston to elevate the tank to said raised position for immersion of the filter element, said start switch being operable when actuated to position said second distributor valve in said second position;

regulator means connected to a source of gas under pressure and having an output;

a first shut-off valve having a spring biasing it into a first position and having a pneumatic operator for moving it to a second position, said first shut-off valve having an input coupled to said regulator means output and normally blocking said output when said shut-off valve is in said first position thereof, and said first shut-off valve connecting said output to a filter supply line and through a rotary pressure-retaining fitting and through a bore of said piston rod to the interior of said filter assembly mounted to said receiver when said shut-off valve is in said second position thereof, said supply line being also connected to one end of a manometer for measurement of the pressure in said line and thereby the pressure in the interior of said filter assembly;

a second pneumatic switch operable by actuator means coupled to said receiver for movement to a second position once per rotation of said receiver, said second switch being operable when in said second position to move said second distributor valve back to said first position thereof and thereby lower said tank, and said second switch being operable when in said second position to supply air from said source to said pneumatic operator through parallel paths, one of said parallel paths including a second variable resistance means and the other including a second check valve and accumulator, application of air to said pneumatic operator being operable to move said shut-off valve to said second position, and said second check valve being oriented to close when said second switch is returned to the initial position thereof whereby said second variable resistance means are effective to delay drop of pressure in said shut-off valve operator when said second switch returns to said first condition after operation by said actuator;

a third pneumatic stop switch having a manual operator, air from said supply source to a second operator for said third switch having a second position admitting said first distributor valve to move said first distributor valve back to the said first position thereof to admit air pressure to said one side of the clamping cylinder piston and vent air from said first accumulator through said first check valve and said first variable resistance device to open said motor switch and vent air pressure from the other side of said clamping cylinder piston to unclamp the filter assembly;

and a fourth pneumatic switch and second shut-off valve operable thereby from a first position to a second position, said second shut-off valve normally blocking communication from a liquid supply reservoir to said tank when said second shut-off valve is in said first position, and said second shut-off valve, when in said second position, providing communication from said liquid supply reservoir to said tank, said fourth switch being operable by said float when the liquid in said tank is below said predetermined level therein to move said second shut-off valve to said second position for replenishing liquid in said tank to maintain said predetermined level therein.

8. A filter testing apparatus comprising:

drive means, a support member, and a lifting member;

a test filter assembly receiver mounted for rotation by said drive means on an axis;

a filter assembly having an apertured end member received on said receiver;

a clamping disc mounted on said receiver and including a sealing member sealingly engaging said receiver and said end member and expanded into position clamping said end member and thereby said filter assembly to said receiver;

a clamping actuator including a double acting pneumatic cylinder having a piston therein with a hollow piston rod extending in both directions from said piston and having said clamping disc secured thereto, said piston being movable by pressure differential thereacross to decrease the force of engagement of said sealing member with said face to allow contraction of said sealing member and thereby unclamp said filter assembly;

a tank mounted on said lifting member and movable between a lowered position to a raised position wherein a portion of the filter element of the filter assembly is immersed in a liquid in said tank;

a source of fluid pressure;

a first distributor valve coupled to said source and operable between a first filter-release condition venting one side of said piston and pressurizing the other side of said piston and a second filter-clamping condition pressurizing said one side of said piston and venting the other side of said piston, to control clamping and unclamping of the filter assembly;

a start switch operable when actuated to place said first distributor valve in said second condition and clamp said filter assembly;

a drive means control switch connected to said drive means and to said first distributor valve, said control switch being operable by said first distributor valve when in said second filter-clamping condition to activate the drive means for rotation of said filter assembly, said first distributor valve being operable upon return to said first condition to enable said control switch to de-activate said drive means;

a second distributor valve having a first condition normally applying pressure from said source in one direction to said lifting member to hold said tank in the lowered position, and said second distributor valve having a second condition and being operable in said second condition to apply pressure in the opposite direction to said lifting member to elevate the tank to said raised position for immersion of the filter element, said start switch being operable when actuated to position said second distributor valve in said second condition;

regulator means connected to a source of gas under pressure and having an output;

a first shut-off valve normally biased into a first condition and having a pneumatic operator for moving it to a second condition, said first shut-off valve having an input coupled to said regulator means output and normally blocking said output when said shut-off valve is in said first condition thereof, and said first shut-off valve connecting said output through the bore of said piston rod to the interior of said filter assembly mounted to said receiver when said shut-off valve is in said second condition thereof;

a pressure measuring instrument communicating with the interior of said filter assembly through said piston rod bore;

a tank control switch operable by actuator means coupled to said receiver for movement to a second condition by rotation of said receiver, said tank control switch being operable when in said second condition to move said second distributor valve back to said first condition thereof and thereby lower said tank, and said tank control switch being operable when in said second condition to supply pressure from said source to said shut-off valve pneumatic operator, application of pressure to said pneumatic operator being operable to move said shut-off valve to said second condition, there being means connected to said operator to delay drop of pressure in said shut-off valve operator when said tank control switch returns to said first condition after operation by said actuator means;

and a stop switch having a second condition applying pressure from said supply source to a second operator for said first distributor valve to move said first distributor valve back to the said first condition thereof to admit pressure to said one side of the clamping cylinder piston and vent air pressure from the other side to unclamp the filter assembly and operate said drive means control switch to de-activate said drive means.

9. A filter testing apparatus comprising:

drive means, a support member, and a lifting member;

a test filter assembly receiver mounted for rotation by said drive means on an axis;

a filter assembly having an apertured end member received on said receiver;

a clamping member mounted on said receiver and including a sealing member in position clamping said end member and thereby said filter assembly to said receiver;

a clamping actuator;

a tank mounted on said lifting member and movable between a lowered position to a raised position wherein a portion of the filter element of the filter assembly is immersed in a liquid in said tank;

a source of fluid pressure;

a first distributor valve coupled to said source and to said clamping actuator and operable between a first filter-release condition and a second filter-clamping condition to control clamping and unclamping of the filter assembly;

a start switch operable when actuated to place said first distributor valve in said second condition and clamp said filter assembly;

a drive means control switch connected to said drive means and to said first distributor valve, said control switch being operable by said first distributor valve when in said second filter-clamping condition to activate the drive means for rotation of said filter assembly, said first distributor valve being operable upon return to said first condition to enable said control switch to de-activate said drive means;

a second distributor valve having a first condition normally applying pressure from said source in one direction to said lifting member to move said tank to a lowered position, and said second distributor valve having a second condition and being operable in said second condition to apply pressure in the opposite direction to said lifting member to elevate the tank to said raised position for immersion of the filter element, said start switch being operable when actuated to position said second distributor valve in said second condition;

regulator means connected to a source of gas under pressure and having an output;

a first shut-off valve normally biased into a first condition and having a fluid controlled operator for moving it to a second position, said first shut-off valve having and input coupled to said regulator means output and normally blocking said output when said shut-off valve is in said first condition thereof, and said first shut-off valve connecting said output to the interior of said filter assembly mounted to said receiver when said shut-off valve is in said second condition thereof;

a pressure measuring instrument communicating with the interior of said filter assembly;

a tank control switch operable by actuator means coupled to said receiver for movement to a second condition by rotation of said receiver, said tank control switch being operable when in said second condition to move said second distributor valve back to said first condition thereof and thereby lower said tank, and said tank control switch being operable when in said second condition to supply pressure from said source to said shut-off valve operator, application of pressure to said pneumatic operator being operable to move said shut-off valve to said second condition;

and a stop switch having a second condition applying pressure from said supply source to a second operator for said first distributor valve to move said first distributor valve back to the said first condition thereof to unclamp the filter assembly and operate said drive means control switch to de-activate said drive means.

References Cited

UNITED STATES PATENTS 2,432,814  12/1947  Schmidt _____ 73—45.5

LOUIS R. PRINCE, *Primary Examiner.*

W. A. HENRY, *Assistant Examiner.*